June 25, 1957 L. C. BANKER 2,797,008
BOAT AND HOUSE TRAILER ASSEMBLY
Filed Jan. 26, 1955 3 Sheets-Sheet 3
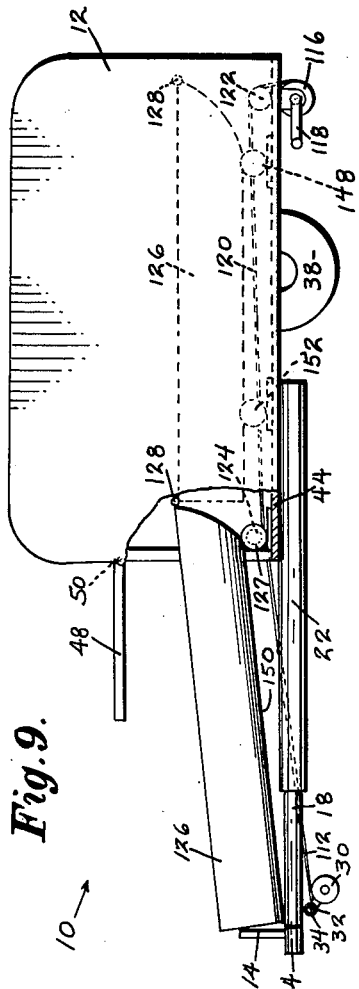
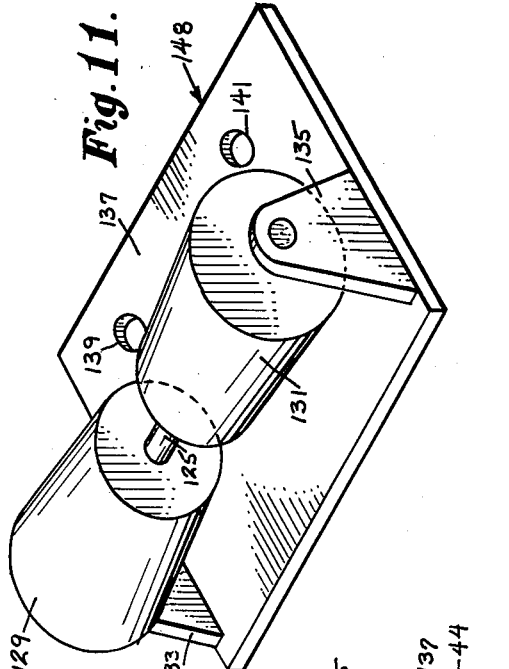
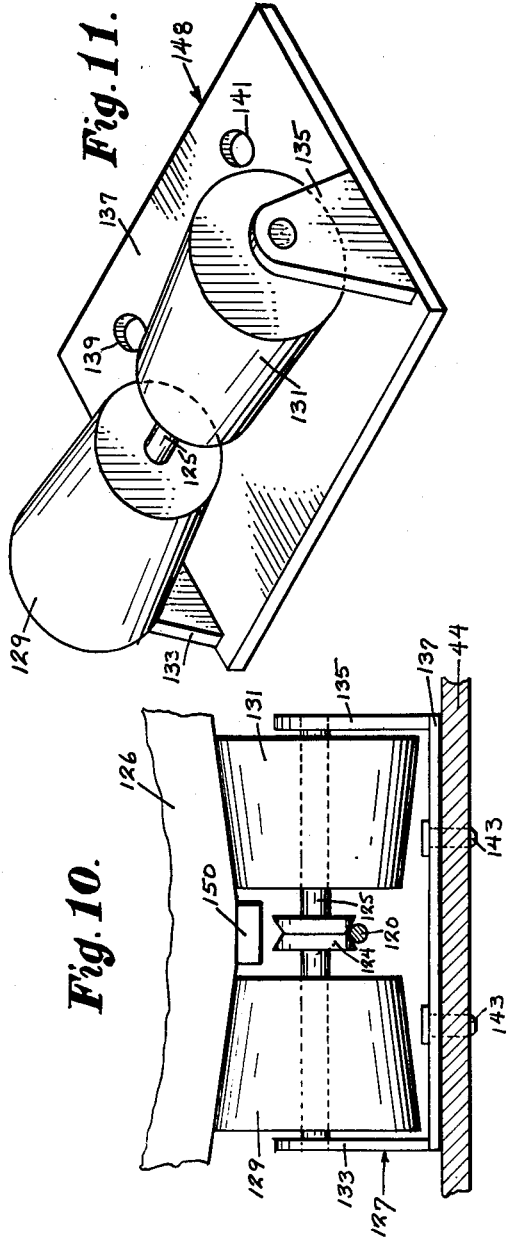
INVENTOR.
L. C. Banker
BY Arthur H. Sturges.
Attorney

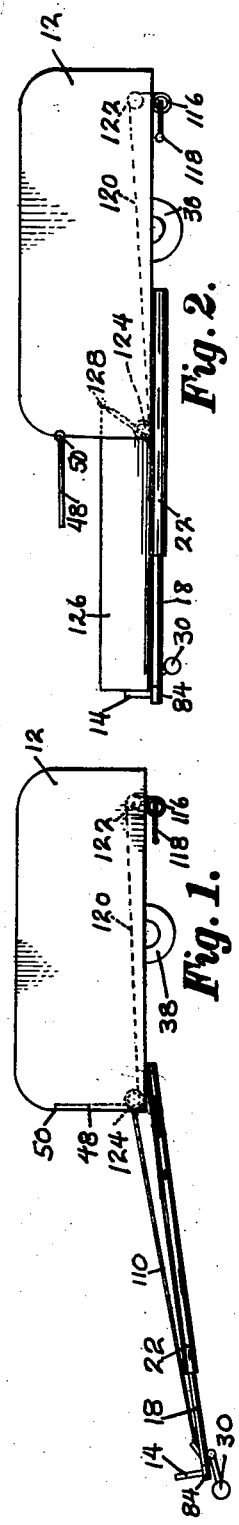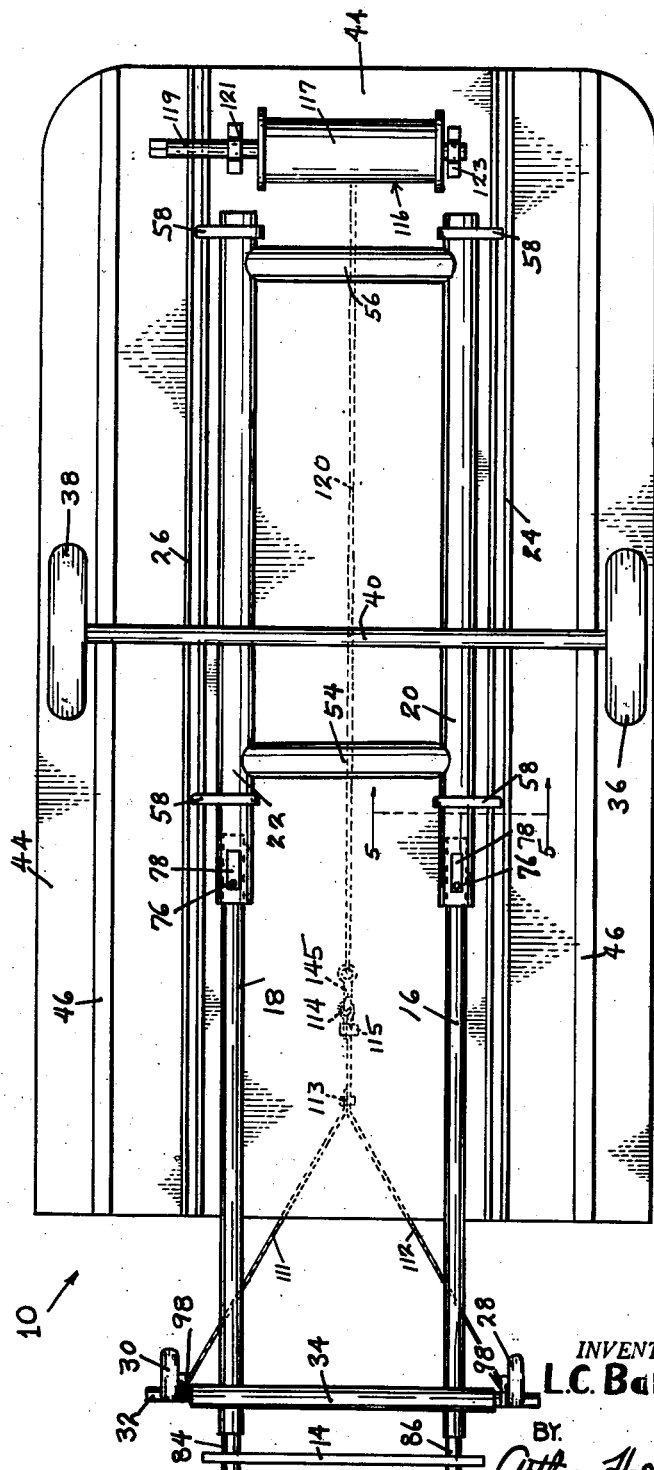

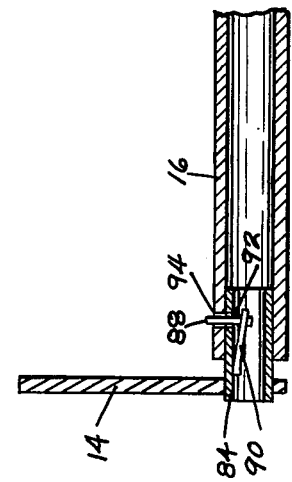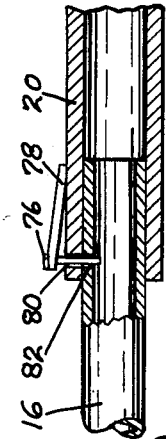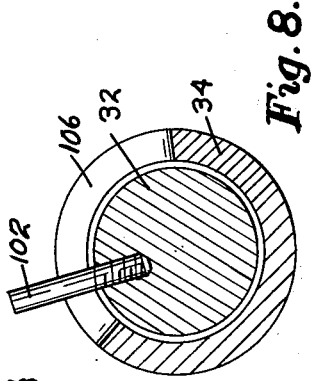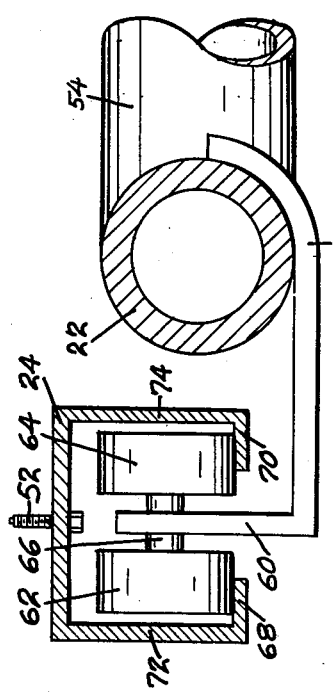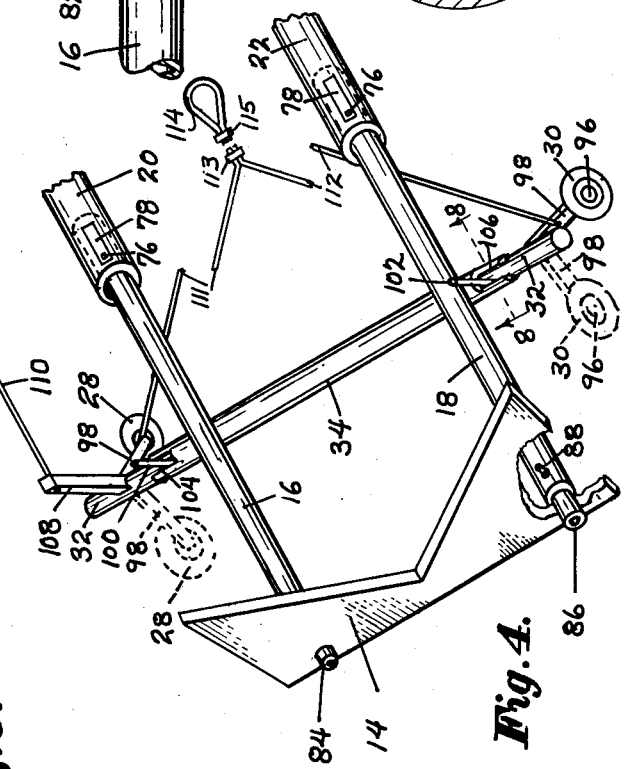

United States Patent Office 2,797,008
Patented June 25, 1957

2,797,008

BOAT AND HOUSE TRAILER ASSEMBLY

Louis C. Banker, Britt, Iowa

Application January 26, 1955, Serial No. 484,153

9 Claims. (Cl. 214—505)

This invention relates to trailers particularly for use by sportsmen, and in particular a sportsman's cabin having a trailer housing mounted on wheels, and a boat launching attachment slidably mounted in the housing whereby a boat is adapted to be carried in the cabin or housing in transportation and may be launched by sliding the boat carrying elements from the rear of the housing and dropping the boat into the water from the trailing end, and wherein the housing or cabin is adapted to be used as living quarters during recreational activities, such as camping and the like.

The purpose of this invention is to provide a combination house and boat trailer in which a boat may be carried in a trailer body for transportation and wherein the trailer may be used in the conventional manner after the boat is removed.

In numerous instances sportsmen, and particularly fishermen and hunters require the use of boats on trips or expeditions, and although it is possible to fasten boats on car tops it is sometimes difficult to remove the boats when use thereof is desired. Many boats are carried on two wheel trailers, however, in most instances it is also desirable to carry camping equipment and it is difficult to carry the camping equipment in the open boat or in the rear seat of the vehicle.

With these thoughts in mind this invention contemplates a conventional house trailer in which a telescoping boat carrying frame is incorporated so that a boat may be carried in the trailer housing and wherein the housing is adapted to be used in the conventional manner after the boat is removed.

The object of this invention is, therefore, to provide a combination boat and house trailer in which means is provided for readily sliding a boat into the body of a trailer for transportation and wherein the boat is readily withdrawn from the rear when use thereof is desired.

Another object of the invention is to provide a combination boat and house trailer in which the trailer is adapted to be used in the conventional manner when the boat is removed therefrom.

Another important object of the invention is to provide means in a house trailer for accommodating a boat wherein the boat is drawn into the trailer and also ejected therefrom from the forward end of the trailer.

A further object of the invention is to provide a combination boat and house trailer in which the means for drawing a boat into the trailer and also the means for removing the boat from the trailer are both adapted to be actuated by a single operator.

An important object of the invention is to provide a cooperative launching ways mechanism for facilitating a launching of a boat from the interior of the house trailer, said ways to be so constructed that the parts thereof may be readily attached to the floor of the house trailer by means of removable detent pins whereby said floor may be cleared during occupancy of the trailer by an owner and at times subsequent to a launching of a boat outwardly of the trailer.

A still further object of the invention is to provide a combination house and boat trailer which is of a simple and economical construction.

With these and other objects and advantages in view the invention embodies a house or cabin trailer of the type mounted on two wheels with a telescoping boat carrying frame mounted in the lower part of the body and having wheels carried by pivotally mounted arms on the extended end, and wherein means is provided for raising and lowering the wheels on the extended end of the frame and also for moving the boat carrying frame into and out of the body from the forward end of the body.

Other features and advantages of the invention will appear from the following description taken in connection with the drawings, wherein:

Figure 1 is a side elevational view of the combination boat and house trailer with the boat carrying frame shown in the extended position, and with the extended end lowered.

Figure 2 is a side elevational view similar to that shown in Figure 1, showing a boat on the frame, and illustrating the trailer with the boat partially drawn into the body of the trailer.

Figure 3 is a view looking upwardly toward the under surface of the trailer.

Figure 4 is a perspective view showing the outer end of the trailer boat carrying frame with other parts broken away and showing the supporting rollers thereof in full lines in the position of retaining the frame elevated and in dotted lines in the folded positions wherein the end of the frame is lowered.

Figure 5 is a cross section taken on line 5—5 of Figure 3 illustrating the mounting of the boat carrying frame in tracks or rails in the body of the trailer, the parts being shown on an enlarged scale.

Figure 6 is a longitudinal section through the trailing end of one of the telescoping beams of the frame showing a mounting of a detent pin for retaining a boat holding chock in the end of the frame.

Figure 7 is a longitudinal section through the telescoping beam and the end of the beam mounted in the rails of the track in the trailer body showing the detent pin for locking the telescoping beam in the extended position.

Figure 8 is a cross section through the axle on the trailing end of the boat carrying frame taken on line 8—8 of Figure 4, with the parts shown on an enlarged scale, and showing a pin for limiting the turning movement of the roller carrying shaft.

Figure 9 is a side elevation, partly in section, of the new device and depicting the relative position of certain parts thereof during a loading or an unloading of a boat into or out of the house trailer of the new device.

Figure 10 illustrates a transverse sectional portion of the floor of said house trailer and showing a side elevation of a part of the said ways and a fragment of a boat mounted on said ways.

Figure 11 is a perspective view of a further part of the said ways.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numeral 12 the cabin, housing, or body of the trailer on which is mounted a boat carrying frame, numeral 14 a chock removably mounted in the trailing end of the boat carrying frame, numerals 16 and 18 telescoping beams of the frame, numerals 20 and 22 traveling tubular beams of the frame, numerals 24 and 26 rails of a track in the body of the trailer, numerals 28 and 30 wheels for supporting the trailing end of the frame and which are mounted on a shaft 32 in a tube 34, wheels 36 and 38 mounted on an axle 40 for supporting the trailer body. A conventional hitch, not shown, is secured to the forward end of the trailer for attaching the latter to a towing vehicle at desired times.

The house trailer 12 is provided with a floor or platform 44 which is supported by joists 46, from which side walls extend, and the trailing end is provided with a door 48 that is pivotally mounted on the end of the housing or body with a hinge 50. With the door hinged horizontally it is free to swing outwardly, as shown in Figure 2, to permit a boat to pass through the rear of the housing. The body of the trailer is provided with conventional windows and doors, which are not shown in the drawings.

The rails 24 and 26 are secured to the floor of the trailer, such as by lag screws or bolts 52, and as shown in Figure 5, the traveling tubular beams 20 and 22, which are connected by struts 54 and 56, are mounted in the rails with brackets 58 that are secured, such as by welding, to the beams and that are provided with arms 60 on which rollers 62 and 64 are rotatably mounted with shafts 66. The rails 24 and 26, are channel-shaped in cross section and the rollers 62 and 64 are positioned to travel on flanges 68 and 70 which extend inwardly from side walls 72 and 74 of the rails. By this means the boat carrying frame is adapted to travel longitudinally in the rails of the track on the bottom of the trailer body.

The tubular telescoping beams 16 and 18 slide freely in the beams 20 and 22 and, as shown in Figure 7, the beams 20 and 22 are provided with detent pins 76 that are mounted on springs 78 and that are positioned to extend through openings 80 in the beams 20 and 22 and into openings 82 in the beams 16 and 18 whereby the telescoping beams are locked in extended positions. The springs 78 are adapted to be secured to the beams 20 and 22 by welding, or the like.

The chock 14 its carried by short tubes 84 and 86 which are adapted to extend into the ends of the telescoping tubes 16 and 18 and, as shown in Figure 6, the tubes 84 and 86 are secured in the ends of the tubes 16 and 18 with detent pins 88 carried by springs 90 and positioned to extend through openings 92 in the tubes 84 and 86 and into openings 94 in the tubes 16 and 18. The springs 90 are secured to the inner surfaces of the tubes 84 and 86 by welding or the like. The chock 14, the upper surface of which is V-shaped to hold a boat, is mounted on the tubes 84 and 86 and the tubes 84 and 86 are temporarily held in the telescoping tubes 16 and 18 by the detent pins 88.

The rollers 28 and 30 which are adapted to carry the trailing end of the boat carrying frame are rotatably mounted by pins 96 in the ends of arms 98 which extend from the shaft 32, and the turning movement of the shaft 32 is limited by pins 100 and 102 which extend into slots 104 and 106 in the ends of the tube 34.

The shaft 32 is also provided with a lever 108 to which a cable 110 is attached and, with the boat carrying frame in the extended position, pulling on the cable 110 actuates the rollers 28 and 30 from the full line position shown in Figure 4, to the position shown in dotted lines whereby the end of the frame is lowered, as shown in Figure 1. A cable 111 and a further cable 112 combine to form a bridle, and the cables 111 and 112 are connected by a cable clamp 113. The cable 112 extends beyond the cable clamp 113 and forms a loop 114, and the loop is secured by a further cable clamp 115. The ends of the bridle are connected to the arms 98, whereby upon drawing forwardly upon the loop 114, the rollers are returned to the full line positions and the extended end of the frame is elevated as shown in Figures 2 and 9.

The trailer is also provided with a winch 116 having a removable hand crank 118 which may be attached to the squared end of the shaft 119 of the winch, said squared end being best shown in Figure 3. The winch includes a drum 117 secured to the axle shaft 119, the latter being rotatably mounted in pillow blocks or bearings 121 and 123, as best shown in Figure 3, said blocks being suitably secured to the bottom of the floor 44 of the trailer.

A further cable 120 is employed having an end attached to drum 117. The cable 120 winds around the drum during operation and extends through the floor 44 of the trailer, being disposed over a pulley 122 within and at the forward end of the body of the trailer upon the floor of the latter. The free end of the cable 120 is provided with a hook 145 which engages, at desired times, the loop 114 of the bridle.

Preferably a launching and retreiving ways is employed especially at times when a comparatively heavy boat is to be transported by or launched from the trailer. The said ways includes two or more of the devices depicted in Figures 10 and 11, said devices being of like construction with the exception that the device depicted in Figure 10 is provided with a pulley wheel 124, whereas the other launching ways members are not necessarily provided with pulley wheels.

The launching ways device depicted in Figure 10 includes spaced cone-shaped rollers 129 and 131 which are loosely mounted on an axle shaft 125 for independent rotary movement with respect to each other. The pulley wheel 124 is also loosely and rotatably mounted on the shaft 125, and the cable 120 extends under said pulley at times. The ends of the shaft 125 are supported by oppositely disposed ears 133 and 135, said ears being welded or otherwise suitably secured or formed integral with a base plate 137. The said pulley ways member is indicated at 127. The other ways member shown in Figure 11 is indicated at 148, and is of like construction with respect to the member 127, with the exception that it is not necessarily provided with a pulley wheel 124 between the conical rollers thereof.

The said ways members are each provided with like apertures 139 and 141 for a reception therethrough of like pins 143, the latter being received in suitable apertures or recesses provided in the floor 44 of the trailer whereby the said ways members may be readily removed from the floor subsequent to a launching of the boat 126 from the trailer during the use of the latter for camping purposes. The cable 120 may extend over or under the axle of the ways member 148, as may be desired.

In launching the boat the chock 14 is removed by pressing the detent pins 88 inwardly, and in returning the boat to the trailer the chock is returned to the positions shown in Figures 4 and 6.

With the boat in the body of the trailer the chock 14 is removed and positioned under the stern of the boat whereby the boat may be rigidly blocked for transportation; and when it is desired to remove or launch the boat the chock is removed from its position below the stern of the boat and secured with the tubes 84 and 86 in the ends of the telescoping tubes 16 and 18. With the parts in these positions the cable is attached to the bow of the boat and the boat started outwardly by the winch, as hereinbefore described. Outward movement of the boat may be continued by hand after the bow passes the pulley in the intermediate part of the trailer and in this action the wheels 28 and 30 are extended downwardly, as shown in Figure 2.

From the foregoing specification, it will become apparent that the invention disclosed will adequately accomplish the functions for which it has been designed and in an economical manner and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthly description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent, is:

1. A trailer assembly comprising a trailer body having a platform, side and end walls and a cover mounted on wheels, spaced rails depending from the under surface of the platform of the trailer body, tubular beams carried by rollers mounted to travel in the rails, telescoping beams slidably mounted in said tubular beams, a boat retaining chock removably mounted on the extended end of the frame, a shaft rotatably mounted on the extended end of the frame, wheels carried by arms on extended ends of the shaft for raising and lowering the extended end of the frame, and means for sliding the frame longitudinally of the track and trailer body, said trailer body being adapted to be used in the conventional manner with the boat removed.

2. A trailer assembly comprising a cabin mounted on wheels, a track positioned on the floor of the cabin, a telescoping frame slidably mounted on said track, latching means for retaining the frame in an extended position, a boat holding chock removably mounted on the extended end of the frame, wheels pivotally mounted on the extended end of the frame, means for actuating the wheels to raise and lower the frame, and means for sliding the frame in the track and cabin.

3. In a boat and house trailer assembly, the combination which comprises a trailer body having a floor, walls and a cover, an axle having wheels on the ends secured to the floor, a longitudinally disposed track positioned on the floor, telescoping beams slidably mounted in said track, detent pins positioned to retain sections of the beams in extended positions, a chock slidably mounted in extended ends of the beams, detent pins for retaining the chock in the beams, a shaft rotatably mounted on extended ends of said beams, rollers rotatably mounted on arms extended from ends of the shaft, means for rotating the shaft to actuate the rollers to raise and lower the extended ends of the beams, and means for sliding the beams longitudinally in the track.

4. In a boat and house trailer assembly, the combination which comprises a trailer housing having a floor, a track longitudinally positioned on said floor, telescoping beams slidably mounted in said track, latching means for retaining the beams in extended positions, a chock removably mounted in extended ends of the beams, latching means for retaining the chock in the beams, a shaft rotatably mounted on extended ends of the beams, rollers rotatably mounted on ends of arms extended from ends of said shaft, means for turning the shaft to actuate the rollers to elevate and lower extended ends of the beams, means for limiting the turning movement of the shaft, a winch mounted on the floor of the trailer and adapted to be connected by a cable to a boat on the beams and also to the arms of said rollers, and wheels upon which the trailer housing is mounted.

5. In a boat and house trailer assembly the combination which comprises a cabin including a floor, side walls and a cover, mounted on wheels, a track mounted on the floor of the cabin, a telescoping boat carrying frame mounted in the track, a ways member comprising a base plate provided with a plurality of apertures; pins for said apertures adapted to be received in recesses disposed in the floor of said trailer for preventing sliding movments of said plate with respect to said floor; spaced ears secured at a right angle to said plate; an axle carried by and between said ears; and two rollers journaled on said axle, said rollers being spaced apart for receiving a keel of a boat therebetween.

6. A ways member as defined in claim 5 in which the rollers are of truncated conical contour, the walls thereof being convergently disposed toward each other.

7. A ways member as defined in claim 5 which further includes a pulley wheel journaled on said axle between said rollers.

8. In a boat and house trailer assembly, the combination which comprises a cabin having a platform, side and end walls and a cover, wheels mounted on the under surface of the platform, spaced parallel rails also mounted on the under surface of the platform, tubular beams positioned between the rails, brackets having rollers on extended ends carried by the beams and positioned with the rollers adapted to travel on lower portions of the rails, telescoping beams slidably mounted in the tubular beams, latching means for retaining the telescoping beams in extended positions, a boat chock carried by the extended ends of the telescoping beams, and supporting wheels also carried by the extended ends of the telescoping beams.

9. In a boat and house trailer assembly, the combination which comprises a cabin having a platform, side and end walls and a cover, an axle mounted on the under surface of the platform, wheels rotatably mounted on the ends of the axle, spaced parallel rails, rectangular-shaped in cross section and having longitudinally disposed slots in lower sections thereof, mounted on the undersurface of the platform, longitudinally disposed tubular beams positioned between the rails, brackets having rollers on extended ends carried by the tubular beams and extended through the slots of the rails with the rollers positioned to travel on the lower sections of the rails, telescoping beams slidably mounted in the tubular beams, latching means limiting outward movement of the telescoping beams in the tubular beams and preventing accidental separation of the beams, a shaft rotatably mounted on extended ends of the telescoping beams, arms carried by extended ends of the shaft, wheels rotatably mounted on the arms, a lever extended from the shaft, cables attached to the arms and lever, and a winch mounted on the under surface of the platform and to which the cables attached to the wheel carrying arms are connected, whereby upon winding a cable attached to the cables connected to the arms upon the winch the wheels are drawn downwardly and upon pulling the cable attached to the lever the wheels are moved upwardly lowering the ends of the telescoping beams.

References Cited in the file of this patent

UNITED STATES PATENTS

| | | |
|---|---|---|
| 2,089,717 | Stratton et al. | Aug. 10, 1937 |
| 2,485,793 | Vassar | Oct. 25, 1949 |
| 2,543,349 | Britton | Feb. 27, 1951 |
| 2,558,418 | Brueckman | June 26, 1951 |
| 2,608,314 | Krider | Aug. 26, 1952 |
| 2,613,827 | Van Doorne | Oct. 14, 1952 |
| 2,635,888 | Bailiff | Apr. 21, 1953 |
| 2,636,745 | Cartwright | Apr. 28, 1953 |
| 2,660,443 | Miller | Nov. 24, 1953 |
| 2,711,259 | Jones | June 21, 1955 |
| 2,720,413 | Halverson | Oct. 11, 1955 |

FOREIGN PATENTS

| | | |
|---|---|---|
| 496,549 | Great Britain | Nov. 28, 1938 |